United States Patent
Kerr et al.

(10) Patent No.: US 12,327,389 B2
(45) Date of Patent: Jun. 10, 2025

(54) IMAGE CLASSIFICATION USING RETINAL GANGLION CELL MODELLING

(71) Applicant: University of Ulster, Coleraine (GB)

(72) Inventors: Dermot Kerr, Londonderry (GB); Sonya Coleman, Randalstown (GB); Martin McGinnity, Londonderry (GB)

(73) Assignee: University of Ulster, Londonderry (GB)

( * ) Notice: Subject to any disclaimer, the term of this patent is extended or adjusted under 35 U.S.C. 154(b) by 412 days.

(21) Appl. No.: 17/926,370

(22) PCT Filed: May 19, 2021

(86) PCT No.: PCT/EP2021/063371
§ 371 (c)(1),
(2) Date: Nov. 18, 2022

(87) PCT Pub. No.: WO2021/234043
PCT Pub. Date: Nov. 25, 2021

(65) Prior Publication Data
US 2023/0186448 A1 Jun. 15, 2023

(30) Foreign Application Priority Data
May 20, 2020 (GB) .................................. 2007545

(51) Int. Cl.
*G06V 10/44* (2022.01)
*G06T 5/50* (2006.01)
*G06V 10/82* (2022.01)

(52) U.S. Cl.
CPC ............. *G06V 10/454* (2022.01); *G06T 5/50* (2013.01); *G06V 10/82* (2022.01);
(Continued)

(58) Field of Classification Search
IPC ..................... G06V 10/454,10/82; G06T 5/50, 2207/20084, 2207/20212,
(Continued)

(56) References Cited

U.S. PATENT DOCUMENTS 10,769,447 B1 * 9/2020 Kirch .................. G06N 7/01

FOREIGN PATENT DOCUMENTS

EP 0715737 A1 6/1996
WO 2016172188 A1 10/2016

OTHER PUBLICATIONS

International Search Report, International Application No. PCT/EP2021/063371, mailed on Jul. 20, 2021.
(Continued)

*Primary Examiner* — Mark Roz
(74) *Attorney, Agent, or Firm* — Warner Norcross + Judd LLP

(57) ABSTRACT

A method of processing a digital image for use by a digital image classifier comprises: processing the digital image with computational models of a retinal ganglion cell (RGC) to produce sets of digital image features; and combining the sets of digital image features to produce a multi-channel retina model image. The method may be used in digital image classification and in training a digital image classifier. The creation and use of multi-channel retina model images improves the ability to detect pertinent image features during image classification and so improves the overall classification process.

19 Claims, 6 Drawing Sheets

(52) U.S. Cl.
CPC ............... *G06T 2207/20084* (2013.01); *G06T 2207/20212* (2013.01); *G06T 2207/30041* (2013.01)

(58) Field of Classification Search
IPC ....................................................... 2207/30041
See application file for complete search history.

(56) References Cited

OTHER PUBLICATIONS

International Written Opinion, International Application No. PCT/EP2021/063371, mailed on Jul. 20, 2021.
Search Report, International Application No. GB2007545.3, date of search Feb. 2, 2021.

* cited by examiner

IMAGE CLASSIFICATION USING RETINAL GANGLION CELL MODELLING

FIELD OF THE INVENTION

This invention relates to artificial vision. The invention relates particularly to artificial vision involving modelling retinal ganglion cells (RGC).

BACKGROUND TO THE INVENTION

Biological visual processing begins within the retina, which is a complex, networked organisation of cells comprising photoreceptors, horizontal cells, bipolar cells, amacrine cells and retinal ganglion cells (RGCs). The RGCs, which are a type of sensory neuron, typically include a plurality of the retina's photoreceptors. A typical retina has approximately 1 million RGCs, each pooling a signal from multiple photoreceptors that define a spatial area known as a receptive field (RF). Light, upon entering the eye, is focused onto the photoreceptor layer effecting a change in each cell's potential and forming a signal that is communicated through the various inter-processing layers to the RGCs. In response to the visual stimulus received by the photoreceptors, the RGCs generate electrophysiological output signals known as action potentials (or spikes), which are transmitted via synaptic connections to the visual cortex for higher processing.

Modelling the input/output relationship of RGCs is of interest since employing biologically derived aspects to artificial visual processing can out-perform various machine vision techniques in terms of power, speed and performance. An important step towards developing artificial vision is therefore to develop computational models of the RGCs that aim to replicate biological processing. Conventional artificial vision technologies are based on the theory of biological processing rather than on actual biological cells. However, a complete theoretical understanding of the encoding mechanisms and connectivity of retinal ganglion cells is still unknown and so theoretical based computational models are compromised.

It would be desirable to provide improved artificial vision systems.

SUMMARY OF THE INVENTION

From a first aspect the invention provides a method of processing a digital image for use by a digital image classifier, the method comprising: processing said digital image with each of a plurality of computational models of a retinal ganglion cell (RGC) to produce a respective set of digital image features; and combining said sets of digital image features to produce a multi-channel retina model image. Advantageously, at least some of, preferably all of, said RGC computational models are associated with a respective different receptive field (RF) of a retina.

Preferably, said processing involves processing a respective part of said digital image with a respective one of said RGC computational models. Said respective part of said digital image may correspond with the respective RF associated with the respective RGC computational model.

Preferably, said processing involves convolving said digital image with each of said RGC computational models.

Preferably, at least some of, preferably all of, said respective receptive fields (RFs) are overlapping with at least one other of said respective receptive fields (RFs).

Preferably, at least some of, preferably all of, said respective receptive fields (RFs) have a different size and/or a different shape.

Advantageously, each RGC computational model is calculated from a dataset comprising input data and corresponding output data, wherein the input data comprises image data and the output data represents the response of an RGC to the image data. Preferably, at least some of said RGC computational models are derived from a different RGC and/or a different type of RGC. Optionally, said input data comprises data representing a sequence of images, preferably a sequence of Gaussian images or a sequence of checkerboard images. Optionally, each RGC model is calculated from said dataset by reverse correlation and/or by machine learning. Preferably, each RGC model comprises a spike-triggered average (STA) derived from said dataset.

Preferably, each RGC computational model corresponds to a different spatial portion of said image, and wherein, preferably, said plurality of RGC computational models collectively correspond to the whole image. Preferably, at least some of, preferably all of, said RGC computational models correspond to a spatial portion of the image that overlaps with the spatial image portion corresponding to at least one other of said RGC computational models.

From a second aspect the invention provides a method of digital image classification comprising processing a digital image using the method of the first aspect of the invention, and providing said multi-channel retina model image to a digital image classifier.

From a third aspect the invention provides a method of training a digital image classifier, the method comprising processing digital images using the method of the first aspect of the invention, and providing the corresponding multi-channel retina model images to the digital image classifier.

Typically, said digital image classifier comprises an artificial neural network (ANN).

From a fourth aspect the invention provides a method of classifying a digital image using a digital image classifier, said method including providing said digital image classifier with a plurality of computational models of a retinal ganglion cell (RGC), and processing said digital images in accordance with the method of the first aspect of the invention. The digital image classifier may comprise an artificial neural network (ANN), and providing said digital image classifier with a plurality of computational models of a retinal ganglion cell (RGC) may involve providing said RGC models in a first layer of said ANN.

Optionally, said digital image classifier comprises a convolutional neural network (CNN), and wherein providing said digital image classifier with a plurality of computational models of a retinal ganglion cell (RGC) involves providing said RGC models in a convolutional base of said CNN.

From a fifth aspect the invention provides a digital image processor for use with a digital image classifier, the digital image processor comprising means for performing the method of the first aspect of the invention. The means for performing the method of the first aspect of the invention may comprise hardware, for example a suitably configured integrated circuit such as an ASIC or FPGA, and/or one or more processors (e.g. microprocessor(s)) or computing device(s) programmed with suitably configured computer software.

From a sixth aspect the invention provides a digital image classifier comprising a digital image processor according to the fifth aspect of the invention. The digital image classifier may comprise means for performing the method of any one or more of the second, third and fourth aspects of the invention, wherein said means may comprise hardware, for example a suitably configured integrated circuit such as an ASIC or FPGA, and/or one or more processors (e.g. microprocessor(s)) or computing device(s) programmed with suitably configured computer software.

From one aspect the invention provides an artificial vision encoder based on recordings of real retinal ganglion cells.

In preferred embodiments, recordings of how individual retinal ganglion cells respond to artificial natural image stimulation are used to model RGC behaviour using system identification and computational modelling. The resulting model is transparent and permits individual parameters analysis. Moreover, the model encapsulates the processing within the RGC's neural structure, bypassing the need for complete understanding of biological system but maintaining the processing ability. In addition, low processing requirements make hardware implementations quick and low cost.

Advantageously, a plurality of RGC models used to encode an image to produce a corresponding multi-channel retina model image. The creation and use of multi-channel retina model images improves the ability to detect pertinent image features during image classification and so improves the overall classification process.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Each RGC produces a physiological output signal in response to a visual stimulus. The output signal may be referred to as the response of the RGC.

Figure 1:
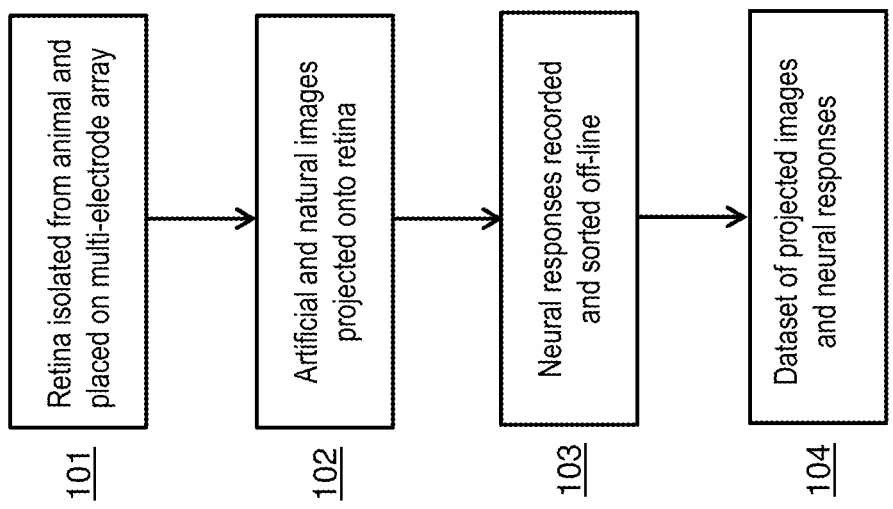
FIG. 1 is a flow chart illustrating a preferred method of obtaining a data set of stimulation images and corresponding RGC responses.

Referring now to FIG. 1 of the drawings, a preferred method of obtaining a representation of individual RGC responses to input digital images is described. At 101 a retina is isolated from an animal, for example an axolotl tiger salamander, and placed on a suitable transducer, conveniently a multi-electrode array, that is capable of detecting output signals from the RGCs and producing corresponding output signals, typically electrical, that can be recorded. The isolated retina may be placed ganglion cell side down on a planar multi-electrode array that is preferably submersed in a chemical solution to prolong extracellular recordings.

At 102, the isolated retina is visually stimulated using a sequence of images, which may comprise artificial and/or natural images. For example artificial images may comprise a sequence of Gaussian white noise images or a sequence of binary checkerboard patterns, while natural images may comprise a sequence of images of real-world scenes. The images may be projected onto the retina in any convenient manner, for example using a miniature organic light-emitting diode (OLED) monitor. One or more lens may be used to de-magnify the images and focus them on the photoreceptor layer of the retina.

At 103, the output signals, or neural responses, of the RGCs are recorded. The response for each cell is represented by a temporal series of spikes known as a spike train, in which the RGC-processed information from the visual stimulus is considered to be encoded. Some pre-processing of the RGC responses may be performed, for example including any one or more of: conventional spike sorting for removing noise and spurious elements; cluster analysis of spike shapes; determining spike occurrence time relative to the beginning of the visual stimulation of step 102. Optionally, each spike train is transformed into a corresponding spike rate. This transformation may be performed in any conventional manner, for example by sliding a mathematical window function along the neural responses or alternatively by averaging responses over multiple trials of the same stimuli.

In any case, at 104, data comprising a set of RGC neural responses (i.e. respective data indicative of the respective response of each of a plurality of RGCs) together with the set of images (i.e. respective image data) that elicited those responses is obtained. The RGC response data is time-correlated with the respective image data.

After the neural recording is complete, the next stage is deriving a computational model for each RGC for which a respective neural response has been recorded, which in preferred embodiments comprises calculating a spike-triggered average (STA) for each RGC. The STA is a means of characterizing the response of an ROC using the spikes emitted by the RGC in response to a time-varying stimulus. The STA provides an estimate of the RGC's receptive field (RF). Calculating an STA, which is sometimes referred to as spike-triggered averaging, may be performed using any conventional technique including reverse correlation or white noise analysis, or by machine learning. The STA is the average stimulus preceding an output spike. To compute the STA, the stimuli in a time window preceding each spike may be extracted and averaged. Reverse correlation is a known technique for determining how sensory neurons sum signals from different locations in theft receptive fields, and also how they sum stimuli that they receive at different times, to generate a response.

The RF is the spatial area of photoreceptors which contribute to an RGC eliciting a response, and may also be referred to as the region of the sensory space (comprising the relevant photoreceptors) in which visual stimulus causes the cell to generate an output signal, i.e. triggers the cell to fire. In reality, the shape of an RF is irregular though it may be approximated to be either circular or elliptical, for example using a 2D Gaussian spatial profile. Identifying a RF in terms of its shape, size and location is part of formulating a model that describes the relationship between stimulus and response.

To calculate the STA, and so to determine the size, location and shape of the RF, the retina is stimulated with artificial stimuli and the correlation between the stimulus and output response is analysed. Alternatively, the natural images may be used as a stimulus. By way of example, the RF may be determined using techniques disclosed in "Dependence of the retinal Ganglion cell's responses on local textures of natural scenes" by Cao X et al, Journal of Vision, 2011 May 20; 11(6). pii: 11. doi: 10.1167/11.6.11. In any case, visual stimuli are used to compute the spatio-temporal STA which provides the RGC's spatio-temporal response. The spatial area identified using this process is subsequently used to determine what region of the image and corresponding pixel intensities are used in the modelling process.

In order to determine the STA, recordings of RGC responses may be made by visually stimulating the retina using temporal and/or spatio-temporal Gaussian white noise sequences, or any other suitable image sequence. Examples of suitable stimuli are presented in FIGS. 2A and 2B, which show a temporal sequence and a spatio-temporal sequence respectively. Each sequence comprises multiple images that are presented sequentially to the retina.

Figure 2B:
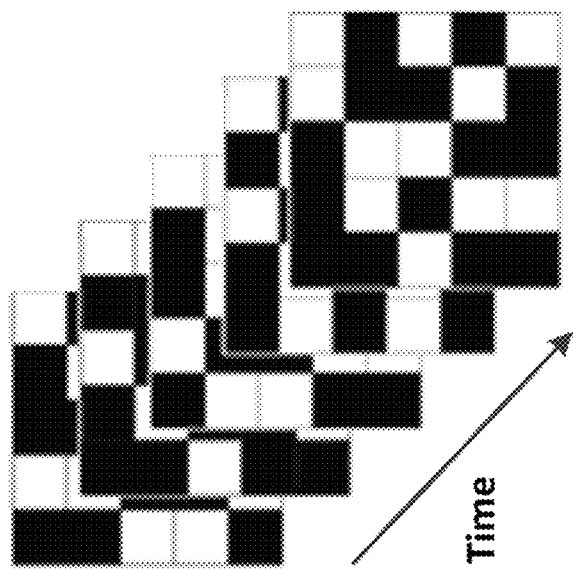
FIG. 2B shows a set of spatio-temporal checkerboard images.
Figure 2A:
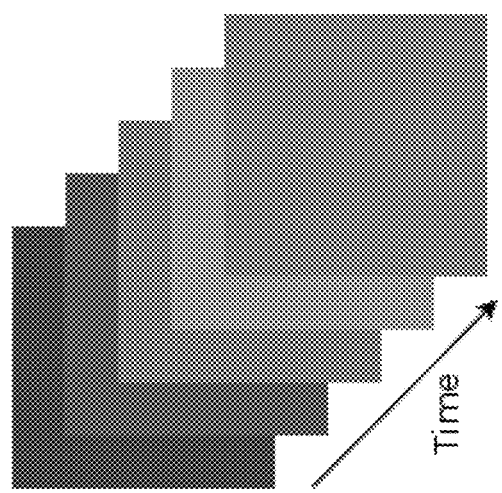
FIG. 2A shows a set of uniform intensity temporal images.

FIG. 2A shows a set of uniform intensity temporal images drawn randomly from a normal distributed Gaussian white noise sequence, typically with zero mean and a standard deviation of 1. The sequence may be generated using the gasdev( )function from the Numerical Recipes library. Such temporal sequences may be used for full field illumination of the retina, where all pixels within each image are illuminated with the same uniform light intensity, thus no spatial arrangement is observable. This is referred to as Full Field Flicker (FFF) and is the least complex form of artificial stimulus used. RGC models derived under these conditions would be considered a subset of the real neural model as they only consider the temporal components.

The image sequence of FIG. 2B extends the stimulus input range to comprise a spatio-temporal input by introducing a binary checkerboard pattern, or Checker-Board Flicker (CBF). CBF extends the complexity of the input due to an additional spatial component varying randomly across time. In terms of modelling, it allows the incorporation of local spatial summation of information within the complete RF whereas FFF does not. Each binary checker may for example have a resolution of 10×10 pixels onscreen, and may be drawn from a random sequence generated using the gasdev( ) function with, for example, an assigned value of either −0.5 or 0.5, independent of neighbouring checkers. The stimulus values of the spatio-temporal input that contribute to the RGC eliciting a spike are used to determine, or estimate, a spatio-temporal receptive field (STRF) for the respective RGC. In this connection it is noted that the STA is an approximation of the STRF and may be obtained from the STRF by any suitable post-processing. Determination of the STRF, or RF, may be performed using any convenient conventional method, for example using reverse-correlation or machine learning.

Typically, the STRF represents both space and time, while an RF typically represents one or other of space and time. Using a sequence such as that shown in FIG. 2A, a temporal RF can be generated. An STRF can be generated from a sequence such as that shown in FIG. 2B. Typically, sequences of the type shown in one or other of FIGS. 2A and 2B may be used to produce an RF or an STRF depending on what type of model it is desired to obtain. In preferred embodiments, the RF or STRF is used to obtain the cell model. Optionally, the STA may represent the cell model.

Figure 3:
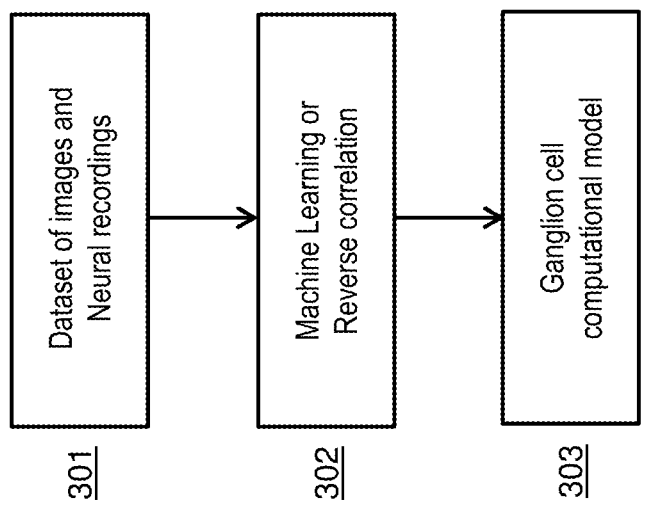
FIG. 3 is a flow chart illustrating a preferred method of obtaining RGC models.

FIG. 3 illustrates how the recorded neural response data and the corresponding input image data can be used to generate a computational model of the RGC. A dataset of images and corresponding neural recordings is obtained (301). At 302 and 303, machine learning or reverse correlation methods are used to create the RGC models from the data. In preferred embodiments, the dataset obtained at step 104 of FIG. 1 is used at step 301. Image data of the type shown in FIG. 2A or 2B may be used to generate the neural responses in the dataset of FIG. 1. To generate the RGC models, the image data may be used as the input and the neural responses as the output.

After the STA is determined an input-output dataset is obtained, where the input corresponds to the pixel intensities within the cell's receptive field region and the output is the spike rate (or other representation of the cell's output response) which has been estimated from the neural response.

Each RGC computational model M can be represented as:

$$M = f(I_n, y) \quad (1)$$

where M is the RGC model, I is the input image data, index n=1, . . . , m where m is the number of frames in the data set, y is the respective response, or spike, output, and f represents a computational function. The obtained STRF is decomposed into corresponding spatial and temporal components, for example using Singular Value Decomposition (SVD) or any other suitable conventional mathematical method, which may be represented by Ms and Mt respectively. In preferred embodiments, the spatial STA is obtained from the STRF, and the spatial STA is used as the model Ms.

In preferred embodiments, the respective RGC spatial component Ms for each RGC is used as a computational model of the RGC.

As described above, in some embodiments, reverse correlation may be performed using Gaussian or checkerboard stimulus to produce the STA, and that the spatial part of the STA may serve as the cell model. Alternatively, the STA is computed, optionally using reverse correlation, resulting in an input-output dataset which is subsequently subjected to machine learning techniques (for example the NARMAX system identification approach and the Self-Organising Fuzzy Neural Network (SOFNN) approach) in order to produce the cell model. This is illustrated in FIG. 3 which indicates that machine learning or reverse correlation may be used to produce the cell model. Typically, reverse correlation is used to produce an input data set (in particular a reduced input data set), and then the cell model may be generated using machine learning or reverse correlation.

Once the computational models M have been obtained they can be used to convert, or encode, digital images or image sequences (such as video clips or movies) into artificial ganglion cell image features. In preferred embodiments, this process involves taking one or more spatial areas of an image that corresponds to the receptive field RF of the respective RGC and using this spatial area as input into the respective RGC model to produce an output comprising RGC digital image features, i.e. corresponding to features produced by the respective modelled RGC. The whole image may be input to each RGC model, in response to which each model is only be responsive to the parts of the image corresponding to its RF.

The digital image features may be used in machine learning systems during the training of the machine learning system and/or during classification of digital images by a trained machine learning system. In preferred embodiments, during training and/or classification, images are encoded as ganglion cell features using RGC models. Optionally, during training and/or classification, images are processed by multiple RGC models and the resultant ganglion cell features are provided as input to the machine learning system, i.e. images are processed by the RGC models as a pre-processing step before image data is provided to the machine learning system. The resulting trained machine learning system can subsequently be used on input images to detect the respective features. Alternatively or in addition the RGC models can be incorporated into the machine learning system to process images provided to the system.

Figure 4:
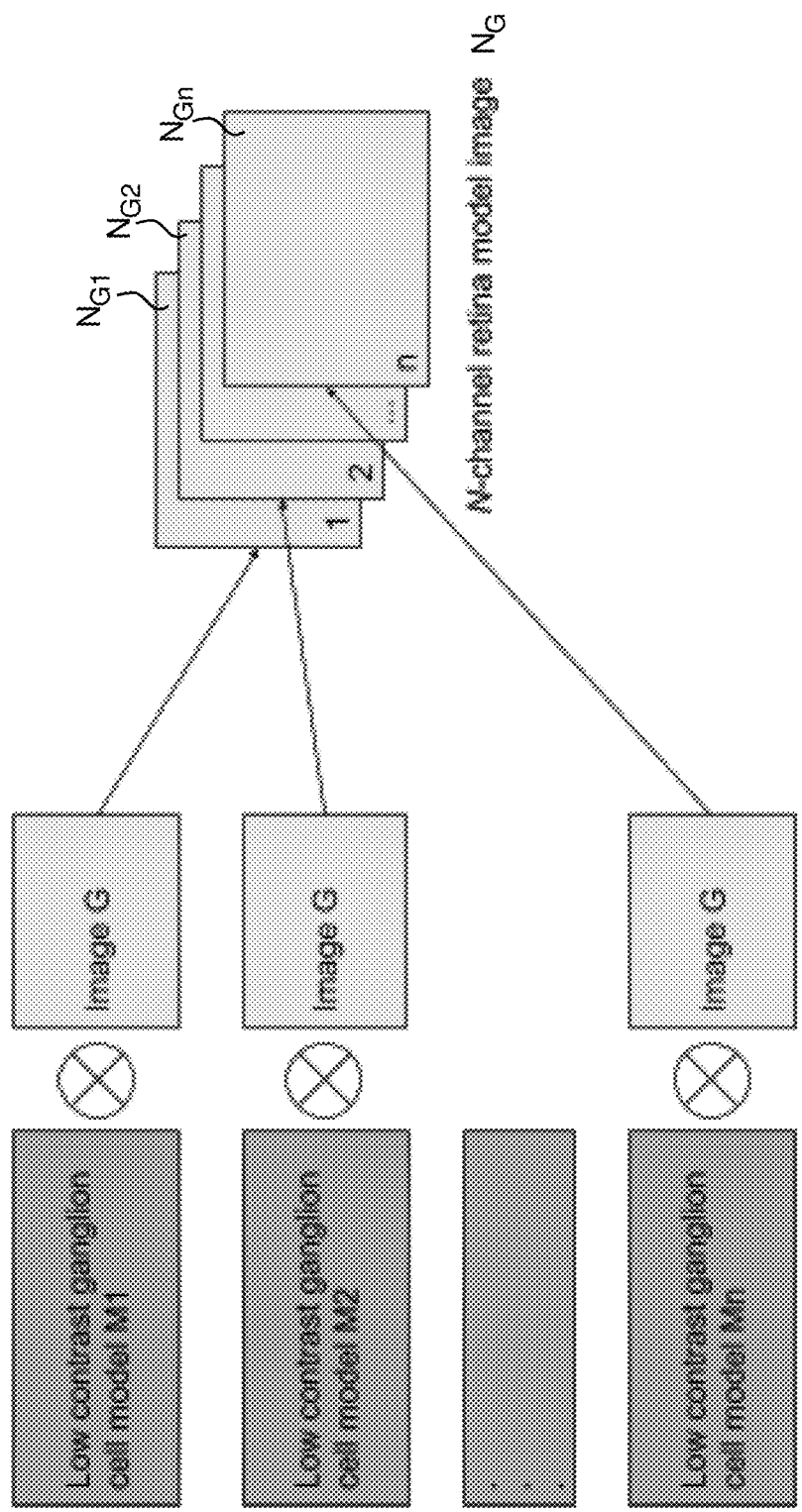
FIG. 4 is a schematic diagram illustrating the preferred method of generating a multi-channel retina model image.

Referring now to FIG. 4 of the drawings, a preferred embodiment is described in which a plurality n of RGC models M1 to Mn are used to process, or encode, an image G (or more particularly data representing the image) to produce a multi-channel (or N-channel) retina model image $N_G$. At least some of, and preferably all of, the n RGC models M1 to Mn are of a different type (e.g. associated with a different RF and/or a different RGC and/or a different type of RGC). Each RGC model M1 to Mn, processes the image G to produce a respective part, or channel, $N_{G1}$, to $N_{gn}$ of the multi-channel retina model image $N_G$. Each part $N_{G1}$ to $N_{Gn}$ of the retina model image $N_G$ encodes different types of visual features within the image G. Accordingly, each part $N_{G1}$ to $N_{Gn}$ of the retina model image $N_G$ comprises a respective set of image features extracted from the image G. The retina model image $N_G$ may be provided as an input to a machine learning system in order to train the machine learning system to perform image classification. Alternatively, images that are to be classified by a trained machine learning system may be pre-processed to produce a corresponding multi-channel retina model image $N_G$, the retina model image $N_G$ then being provided to the machine learning system for classification. Each RGC model may be said to produce a respective channel, or part, of the retina model image $N_G$ in that the respective output of each RGC model corresponds to different types of extracted digital image features, and wherein each type may be determined by the receptive field (RF) associated with the respective RGC model. The combined outputs of the RGC models may be said to comprise a retina model image in that, collectively, the respective RF with which the RGC models are associated correspond to different ganglion cells of a retina, in particular different RFs formed from the respective RGCs within a retina. The respective output from each RGC model, when the image is processed, comprises a respective set of digital image features. The creation and use of multi-channel (or N-channel) retina model images $N_G$ improves the ability to detect pertinent image features during image classification and so improves the overall classification process.

In preferred embodiments, and as illustrated in equation (2), the retinal model image $N_G$ is obtained by convolving the RGC models M with the image data G and combining the outputs to form the N-channel retinal model image, where n is the number of RGC models used:

$$N_G = M \otimes G \qquad (2)$$

In preferred embodiment, overlapping convolution is used when convolving the RGC models M with the image data G.

In preferred embodiments, the image G is an intensity image wherein each pixel is represented by a single intensity value. Other conventional digital representations of the image G may be used, e.g. comprising colour or multispectral channel(s).

In preferred embodiments, selecting RGC models of different types for producing the retina model image may be performed manually. The selected models preferably correspond to cells where the receptive fields have different size and shape. The models are preferably applied in an overlapping manner across the images.

Figure 5:
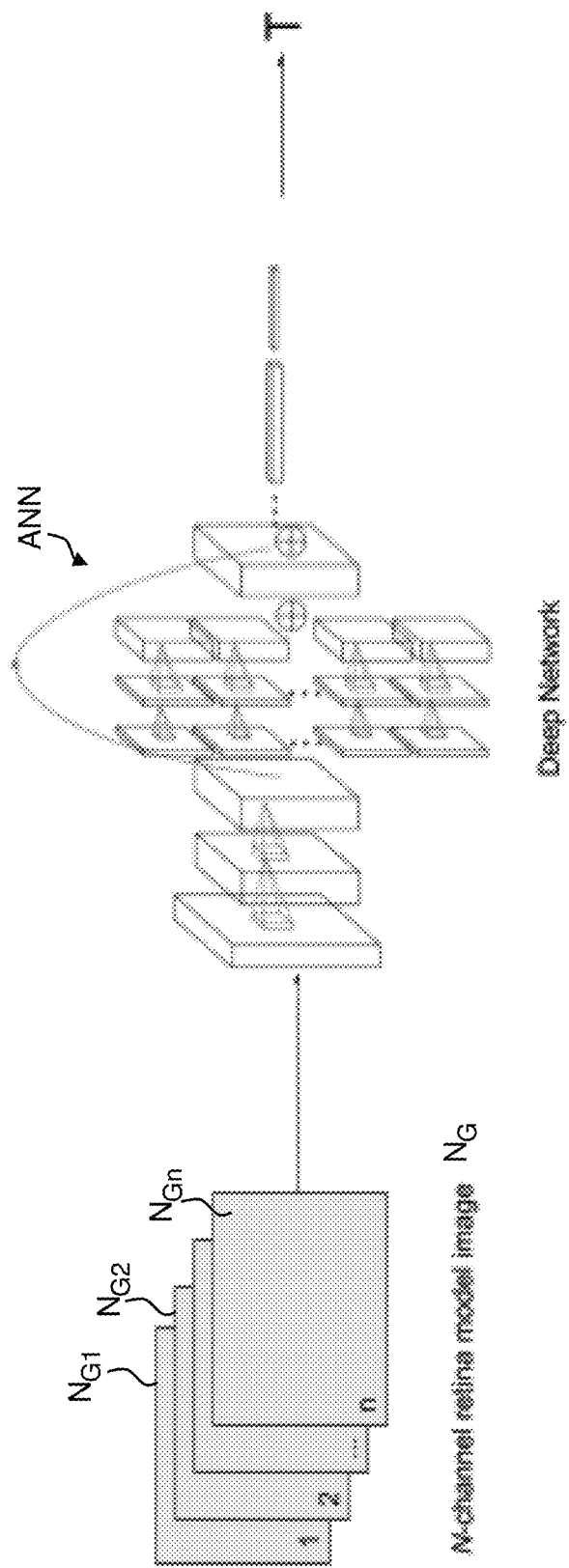
FIG. 5 is a schematic diagram illustrating a machine learning system receiving a multi-channel retina model image in accordance with one aspect of the invention.

FIG. 5 illustrates how retina model images $N_G$ can be used with a machine learning system MLS in a training mode to train the machine learning system MLS, or in a classification mode in order to classify the image used to create the retina model image $N_G$. The operation of the machine learning system MLS can be represented mathematically as:

$$T = D(N_G) \qquad (3)$$

where T is the target output and D is the function implemented by machine learning system MLS.

The machine learning system MLS may comprise any conventional machine learning system but typically comprises an artificial neutral network ANN, which may take any conventional form. The ANN typically comprises a series of network layers, including an input layer, an output layer and one or more intermediate layers. Each layer comprises one or more network nodes, the nodes of each layer being connected to one or more nodes of the next layer by one or more weighted connections. In preferred embodiments, the ANN comprises a deep learning network. The MLS of FIG. 5 may be described as a digital image classifier.

In the training mode, multiple N-channel retina model images $N_G$ are used to train the machine learning system MLS, and in particular the ANN. Using retina model images $N_G$ to train the ANN rather than raw images to train the ANN improves the ANN's ability to detect pertinent image features during image classification and so to improve the classification process.

In the classification mode, each input image is first converted to its corresponding N-channel retinal model image $N_G$ prior to being input to the machine learning system MLS, and more particularly to the ANN. This improves the ANN's ability to detect pertinent image features during image classification and so to improve the classification process.

The images to be classified are converted into N-channel retina images preferably using the same RGC models as were used for the training images.

Figure 6:
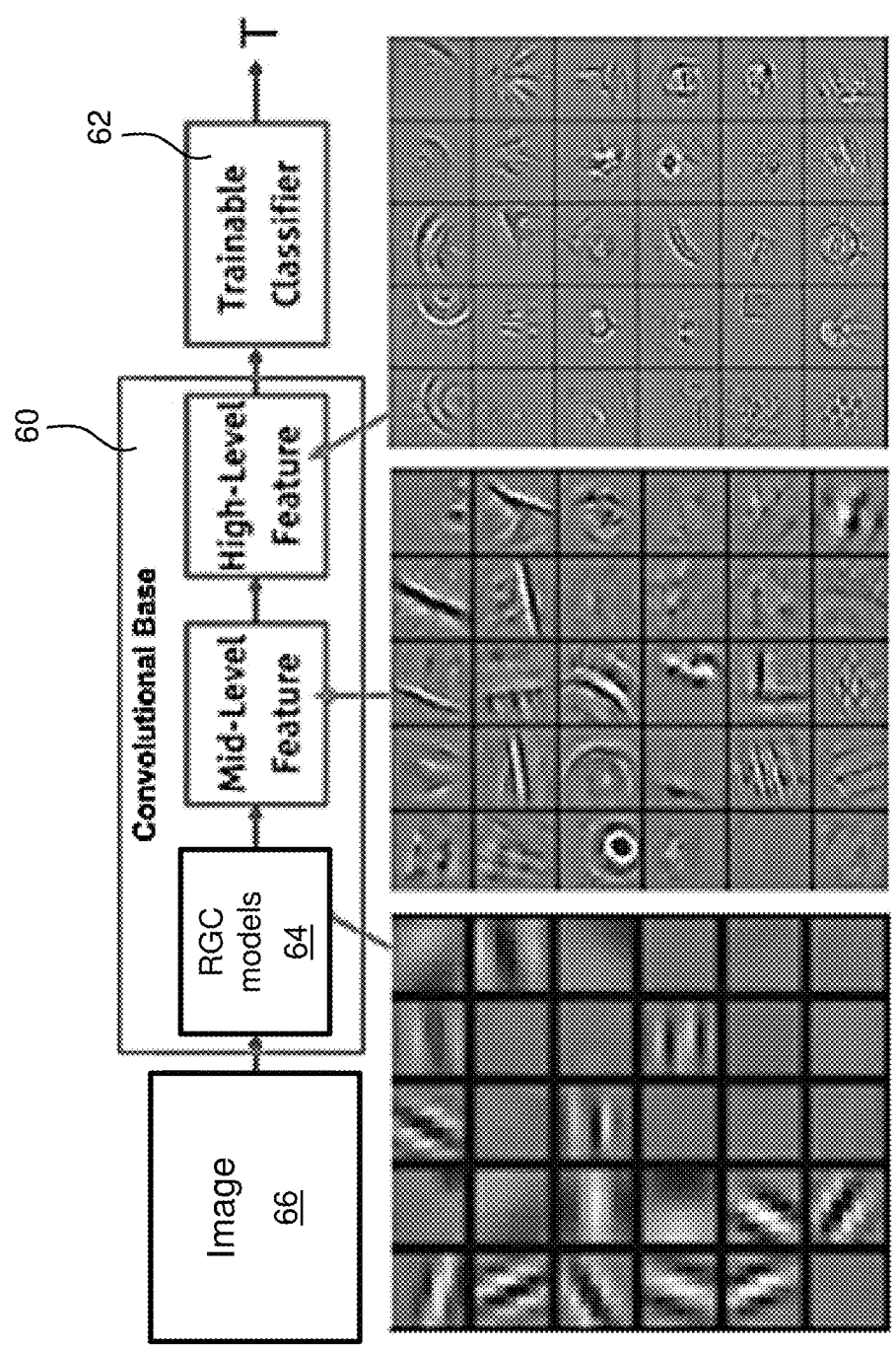
FIG. 6 is a schematic diagram of a convolutional neural network embodying another aspect of the invention.

In alternative embodiments, the RGC models M1 to Mn may be incorporated into the machine learning system MLS, and in particular into the ANN. In such embodiments, the ANN preferably comprises a convolutional neural network (CNN). With reference to FIG. 6, a CNN comprises a convolutional base 60 and a trainable classifier 62. The trainable classifier 62 may take any conventional form, typically comprising a trainable multi-layer ANN. The convolutional base 60 typically comprises one or more convolutional layer and one or more pooling layer. The convolutional base 60 is configured to extract image features from an input image. The classifier 62 is configured to classify the image from the image features extracted by the convolutional base 60. The CNN of FIG. 6 may be described as a digital image classifier.

CNNs are suitable for use in transfer learning applications. Transfer learning is a popular method in computer vision because it allows accurate models to be created in a timesaving way. With transfer learning, patterns that have been learned when solving previous problems are used to solve new problems. In computer vision, transfer learning is usually implemented through the use of pre-trained models. A pre-trained model is a model that was trained on a large benchmark dataset to solve a problem similar to a current problem to be solved. It is common practice to import and use models from published literature (e.g. VGG, Inception, MobileNet). A notable aspect of such deep learning models is that they can automatically learn hierarchical feature representations. This means that features computed by the first layer are general and can be reused in different problem domains, while features computed by the last layer are specific and depend on the chosen dataset and task.

In a conventional CNN, the convolutional base 60 includes one or more lower layer, i.e. one or more layers at or close to the input, that are configured to perform low level feature extraction from input image data. In CNNs embodying the invention, the convolutional base 60 comprises a layer 64 comprising a set of RGC models M. The RGC models may be the same as or similar to the models M1 to Mn as described above and may be obtained in the same way. In comparison with a conventional CNN, the low level feature extractor(s) of the convolutional base 60 are replaced by a layer of RGC models M. In preferred embodiments, the RGC model layer 64 is the first layer of the convolutional base 60. An Image 66 provided to the CNN is processed by the RGC model layer 64 which extracts general image features from the input image. The extracted features are provided to the subsequent parts of the CNN and processed in conventional manner. The RGC model layer 64 may extract features by creating a multi-channel retina model image $N_G$, as described above.

Advantageously, the classifier part 62, and the mid- and high-level feature layers of the convolutional base 60 may be conventional and so the specialised features of the CNN are retained along with the properties of the biological retina.

A standard deep-learning network D that produces a target output T from a standard intensity image G as input may be defined as:

$$T = D(G) \quad (4)$$

where the deep network D is composed of the components D ($\{C_l, c_m, c_h, t\}$, G) where $c_l$, $c_m$, and $c_h$ correspond to the low-, mid- and high-level feature layers respectively in the convolutional base 60 and t corresponds to the trainable classifier 62. In preferred embodiments, the low-level feature layer $C_l$ is replaced with a set of $M^s_n$ RGC models such that:

$$D(\{M^s_n, c_m, c_h, t\}, G) \quad (5)$$

It will be apparent from the foregoing that embodiments of the invention encode features in a digital image using biologically derived computational models for subsequent learning processes, including training and classification processes. The models encapsulate the processing within an RGC's neural structure, bypassing the need for complete understanding of biological system but maintaining the processing ability. In addition, low processing requirements make hardware implementations quick and low cost.

Embodiments of the invention may be implemented in any convenient manner, for example in computer software and/or in hardware. For example, some aspects of the invention may be embodied as a machine learning system, in particular a digital image classifier, in which case the systemIciassifier may be implemented in hardware, for example by a suitably configured integrated circuit such as an ASIC or FPGA. Other aspects of the invention may be implemented as a digital image processor, or encoder, and may be implemented in hardware, for example by a suitably configured integrated circuit such as an ASIC or FPGA. Alternatively, machine learning systems, classifiers, processors or encoders embodying aspects of the invention may be implemented in computer software, or by a combination of hardware and software as is convenient.

The invention is not limited to the embodiment(s) described herein but can be amended or modified without departing from the scope of the present invention.

The invention claimed is:

1. A method of processing a digital image for use by a digital image classifier, the method comprising:
   processing said digital image with each of a plurality of computational models of at least one retinal ganglion cell (RGC) to produce a respective set of digital image features, wherein the plurality of computational models of the at least one RGC are derived by calculating a spike-triggered average (STA), wherein the STA characterizes a response using spikes emitted by the at least one RGC in response to a time-varying stimulus; and
   combining said sets of digital image features to produce a multi-channel retina model image.

2. The method of claim 1, wherein at least some of, preferably all of, said RGC computational models are associated with a respective different receptive field (RF) of a retina.

3. The method of claim 1, wherein said processing involves processing a respective part of said digital image with a respective one of said RGC computational models.

4. The method of claim 3, wherein at least some of, preferably all of, said RGC computational models are associated with a respective different receptive field (RF) of a retina, and wherein said respective part of said digital image corresponds with the respective RF associated with the respective RGC computational model.

5. The method of claim 1, wherein said processing involves convolving said digital image with each of said RGC computational models.

6. The method of claim 1, wherein at least some of, preferably all of, said RGC computational models are associated with a respective different receptive field (RF) of a retina, and wherein at least some of, preferably all of, said respective receptive fields (RFs) are overlapping with at least one other of said respective receptive fields (RFs).

7. The method of claim 1, wherein at least some of, preferably all of, said RGC computational models are associated with a respective different receptive field (RF) of a retina, and wherein at least some of, preferably all of, said respective receptive fields (RFs) have a different size and/or a different shape.

8. The method of claim 1, wherein each RGC computational model is calculated from a dataset comprising input data and corresponding output data, wherein the input data comprises image data and the output data represents the response of an RGC to the image data.

9. The method of claim 8, wherein at least some of said RGC computational models are derived from a different RGC and/or a different type of RGC.

10. The method of claim 8, wherein said input data comprises data representing a sequence of images, preferably a sequence of Gaussian images or a sequence of checkerboard images.

11. The method of claim 8, wherein each RGC model is calculated from said dataset by reverse correlation and/or by machine learning.

12. The method of claim 8, wherein each RGC model comprises a spike-triggered average (STA) derived from said dataset.

13. The method of claim 1, wherein at least some of, preferably all of, said RGC computational models are associated with a respective different receptive field (RF) of a retina, and wherein each RGC computational model corresponds to a different spatial portion of said image, and wherein, preferably, said plurality of RGC computational models collectively correspond to the whole image.

14. The method of claim 13, wherein at least some of, preferably all of, said RGC computational models correspond to a spatial portion of the image that overlaps with the spatial image portion corresponding to at least one other of said RGC computational models.

15. A method of training a digital image classifier, the method comprising processing digital images using a method of processing a digital image, and providing the corresponding multi-channel retina model images to the digital image classifier, wherein said method of processing a digital image comprises:

processing said digital image with each of a plurality of computational models of at least one retinal ganglion cell (RGC) to produce a respective set of digital image features, wherein the plurality of computational models of the at least one RGC are derived by calculating a spike-triggered average (STA), wherein the STA characterizes a response using spikes emitted by the at least one RGC in response to a time-varying stimulus; and combining said sets of digital image features to produce a multi-channel retina model image.

16. The method of claim 15, wherein said digital image classifier comprises an artificial neural network (ANN).

17. A method of classifying a digital image using a digital image classifier, said method including providing said digital image classifier with a plurality of computational models of at least one retinal ganglion cell (RGC), processing said digital image with each of a plurality of computational models of a retinal ganglion cell (RGC) to produce a respective set of digital image features, wherein the plurality of computational models of the at least one RGC are derived by calculating a spike-triggered average (STA), wherein the STA characterizes a response using spikes emitted by the at least one RGC in response to a time-varying stimulus; and combining said sets of digital image features to produce a multi-channel retina model image.

18. The method of claim 17, wherein said digital image classifier comprises an artificial neural network (ANN), and wherein providing said digital image classifier with a plurality of computational models of a retinal ganglion cell (RGC) involves providing said RGC models in a first layer of said ANN.

19. The method of claim 17, wherein said digital image classifier comprises a convolutional neural network (CNN), and wherein providing said digital image classifier with a plurality of computational models of a retinal ganglion cell (RGC) involves providing said RGC models in a convolutional base of said CNN.

* * * * *